US009587742B2

(12) United States Patent
Robbins

(10) Patent No.: US 9,587,742 B2
(45) Date of Patent: Mar. 7, 2017

(54) WEAR RING FOR DIE-CASTING PISTON, DIE-CASTING PISTON INCORPORATING SAME, AND METHOD OF FORMING SAME

(71) Applicant: EXCO TECHNOLOGIES LIMITED, Markham (CA)

(72) Inventor: Paul Henry Robbins, Port Perry (CA)

(73) Assignee: EXCO TECHNOLOGIES LIMITED, Markham, Ontario (CA)

( * ) Notice: Subject to any disclaimer, the term of this patent is extended or adjusted under 35 U.S.C. 154(b) by 88 days.

(21) Appl. No.: 14/516,865

(22) Filed: Oct. 17, 2014

(65) Prior Publication Data

US 2015/0107796 A1    Apr. 23, 2015

Related U.S. Application Data

(60) Provisional application No. 61/892,676, filed on Oct. 18, 2013.

(51) Int. Cl.
*B22D 17/20* (2006.01)
*F16J 9/14* (2006.01)
*B22D 17/14* (2006.01)
*B23H 9/00* (2006.01)

(52) U.S. Cl.
CPC .............. *F16J 9/14* (2013.01); *B22D 17/14* (2013.01); *B22D 17/203* (2013.01); *B23H 9/001* (2013.01); *B23H 9/00* (2013.01); *Y10T 29/49815* (2015.01)

(58) Field of Classification Search
CPC ........... B22D 17/203; B29C 45/53; F16J 9/14
USPC .................................................. 164/113, 312
See application file for complete search history.

(56) References Cited

U.S. PATENT DOCUMENTS

| | | | | |
|---|---|---|---|---|
| 1,360,733 A | * | 11/1920 | Deutsch | F16J 9/14 277/497 |
| 1,369,104 A | * | 2/1921 | Hendrickson | F16J 9/14 277/497 |
| 1,930,857 A | * | 10/1933 | Morton | B23C 3/22 29/888.076 |
| 5,048,592 A | | 9/1991 | Mueller | |
| 6,715,767 B1 | * | 4/2004 | Meernik | F16J 9/14 277/459 |

FOREIGN PATENT DOCUMENTS

EP          901852 A1     3/1999
WO    WO2014161101 A1    9/2014

OTHER PUBLICATIONS

EPO machine translation of EP 901852, Mar. 17, 1999.*
Notification of Transmittal of the International Search Report and the Written Opinion of the International Searching Authority for PCT/CA2014/000751dated Jan. 16, 2015.

* cited by examiner

*Primary Examiner* — Kevin E Yoon
(74) *Attorney, Agent, or Firm* — Young Basile Hanlon & MacFarlane, P.C.; Denise M. Glassmeyer

(57) ABSTRACT

A wear ring for a piston of a die-casting apparatus comprises an annular body having a gap extending therethrough. The gap is configured to define at least two circumferentially offset pairs of circumferentially spaced apart facing surfaces. The facing surfaces of each pair are angled and configured to contact each other in a flush manner when the wear ring is circumferentially compressed.

14 Claims, 10 Drawing Sheets

WEAR RING FOR DIE-CASTING PISTON, DIE-CASTING PISTON INCORPORATING SAME, AND METHOD OF FORMING SAME

BACKGROUND

This application claims the benefit of U.S. application Ser. No. 61/892,676 filed on Oct. 18, 2013, the content of which is incorporated herein by reference in its entirety.

The subject disclosure relates generally to die-casting and in particular, to a wear ring for a die-casting piston, a die-casting piston incorporating the same, and a method of forming the same.

In the field of automotive manufacturing, structural components that historically have been fabricated of steel, such as engine cradles, are increasingly being replaced with aluminum alloy castings. Such castings are typically large, convoluted, and relatively thin, and are required to meet the high quality standards of automotive manufacturing. In order to meet these requirements, vacuum-assisted die-casting is typically used to produce such castings.

Vacuum-assisted die-casting machines comprise a piston, sometimes referred to as a "plunger", that is advanced through a piston bore, sometimes referred to as a "shot sleeve", to push a volume of liquid metal into a mold cavity. Vacuum is applied to the piston bore to assist the flow of the liquid metal therethrough. A replaceable wear ring is fitted onto the piston, and makes continuous contact with the inside of the piston bore along the full stroke of the piston for providing a seal for both the vacuum and liquid metal. The wear ring sits freely on a circumferential rib rearward of the front face of the piston tip, and is split to allow it to be installed onto the piston tip prior to use, and to be removed from the piston tip after use.

For example, FIG. 1 shows a portion of a prior art vacuum-assisted die-casting apparatus, which is generally indicated by reference numeral 20. Vacuum-assisted die-casting apparatus 20 comprises a piston that is moveable within a piston bore 22 for pushing a volume of liquid metal (not shown) into a die-casting mold cavity (not shown) to form a casting. In the example shown, the piston is positioned at its starting position of the stroke, which is rearward of a port 24 through which the volume of liquid metal is introduced into the piston bore 22.

The piston comprises a piston tip 30 mounted on a forward end of a piston stem (not shown). The piston tip 30 has a front face 32 that is configured to contact the volume of liquid metal introduced into the piston bore 22 via port 24. The piston tip 30 has a circumferential rib 34 formed on an outer surface thereof adjacent the front face 32, and an upper bore 36 positioned on a top surface of the piston tip 30 for receiving a removable retainer pin 38. The piston tip 30 has a wear ring 40 disposed on an outer surface thereof.

The wear ring 40 may be better seen in FIG. 2. The wear ring 40 consists of a body having a generally annular shape, and comprises an inner circumferential groove 42 that is shaped to receive the circumferential rib 34 of the piston tip 30. The wear ring 40 also comprises a gap 44 for enabling the wear ring 40 to be expanded as needed during installation onto, and removal from, the piston tip 30. The gap 44 is machined using conventional straight cutting, such that facing surfaces 46 of the wear ring 40 on opposite sides of the gap are parallel to the radial direction. The wear ring 40 further comprises a semi-cylindrical notch 48 machined therein at a diametrically opposite position from the gap 44, and which is shaped for accommodating the removable retainer pin 38.

During use, the wear ring 40 is installed onto the piston tip 30 by first inserting the retainer pin 38 into the upper bore 36, and then circumferentially expanding the wear ring 40 and fitting the inner circumferential groove 42 onto the circumferential rib 34 of the piston tip with the semi-cylindrical notch 48 aligned with the retainer pin 38. Once installed, the wear ring 40 is locked in rotational position relative to the piston tip 30, with the gap 44 being positioned at the underside of the piston tip 30, as may be seen in FIG. 1.

The piston having the piston tip 30 with the wear ring 40 installed thereon is then inserted into the piston bore 22 of the die-casting apparatus. As the wear ring 40 is sized such that its outer diameter is slightly greater than the inner diameter of the piston bore, insertion of the piston into the piston bore causes the wear ring 40 to compress circumferentially. In response to the compression, the facing surfaces 46 of the wear ring 40 move into contact with each other. As a result of the straight cutting, the facing surfaces 46 of the wear ring 40 contact each other only partially, and along a contact line 45 as shown in FIG. 3. As will be understood, this partial contact provides a poor seal to any liquid metal exposed thereto.

Other die-casting pistons comprising wear rings have been described. For example, U.S. Pat. No. 5,048,592 to Mueller discloses a plunger for forcing molten aluminum or brass out of a casting cylinder of a die-casting machine. The plunger includes a cap that is screwed via an internal thread onto an external thread of a supporting body and is made of a material, in particular a copper alloy, which has a greater coefficient of thermal expansion than the material of the cylinder, in particular steel, and the material of the supporting body, in particular steel. In one embodiment, the cap has on its outer cover face a cylindrical extension with an outer annular web, which engages into a corresponding inner annular groove of a sealing ring. The sealing ring is split radially in a step shape.

U.S. Pat. No. 7,900,552 to Schivalocchi et al. discloses a piston for a cold chamber die-casting machine comprising a body and at least one sealing band mounted around the body. The body and the band are provided with coupling means for obtaining both an angular locking and an axial locking of the band to the piston body.

U.S. Pat. No. 8,136,574 to Müller et al. discloses a multi-piece piston for fixing to a high pressure side end of a piston rod running axially in a casting cylinder of a cold chamber casting machine. The piston comprises a piston crown forming a piston front face on the high pressure side and a piston body in the form of a bush connected to the piston crown on the low pressure side. Complementary bayonet locking means are provided for axial fixing of the piston to the end of the piston rod, on the piston crown and the end. In one embodiment, the piston carries slotted wearing rings on its outer circumference. The slotted wearing rings have slot edges forming a plurality of steps, with circumferentially running step surfaces bearing against one another.

It is an object at least to provide a novel wear ring for a die-casting piston, a die-casting piston incorporating the same, and a method of forming the same.

SUMMARY

Accordingly, in one aspect there is provided a wear ring for a piston of a die-casting apparatus, the wear ring comprising: an annular body having a gap extending therethrough, the gap being configured to define at least two circumgerentially offset pairs of circumferentially spaced apart facing surfaces, the facing surfaces of each pair being angled and configured to contact each other in a flush manner when the wear ring is circumferentially compressed.

One of the facing surfaces of each pair may be inwardly angled relative to a radial line that bisects the gap between the facing surfaces in a direction towards the inner diameter of the body.

Both of the facing surfaces of each pair may be inwardly angled relative to a radial line that bisects the gap between the facing surfaces in a direction towards the inner diameter of the body.

Both of the facing surfaces of each pair may define an angle with a radial line that bisects the gap between the facing surfaces, the angle defined by each surface being the same. The angle may be from about 1 degree to about 4 degrees.

One of the facing surfaces of each pair may define an angle with a radial line that bisects the gap between the facing surfaces. The angle may be from about 1 degree to about 4 degrees.

Both of the facing surfaces of each pair may extend in an axial direction of the wear ring.

The wear ring may further comprise at least one feature on the annular body configured to engage the piston. The at least one feature may be one of at least one projection and at least one inner circumferential groove.

The wear ring may be used with a piston of a die-casting apparatus. The die-casting apparatus may be a vacuum-assisted die-casting apparatus.

In another aspect, there is provided a piston of a die-casting apparatus, the piston comprising: a piston tip configured to push liquid metal through a piston bore; and a wear ring disposed on an outer surface of the piston tip, the wear ring comprising an annular body having a gap extending therethrough, the gap being configured to define at least two circumferentially offset pairs of circumferentially spaced apart facing surfaces, the facing surfaces of each pair being angled and configured to contact each other in a flush manner when the wear ring is circumferentially compressed.

There may also be provided a die-casting apparatus comprising the piston. The die-casting apparatus may be a vacuum-assisted die-casting apparatus.

In another aspect, there is provided a method comprising: forming a gap in an annular die-casting apparatus wear ring body, the gap being configured to define at least two circumferentially offset pairs of circumferentially spaced apart facing surfaces, the facing surfaces of each pair being angled and configured to contact each other in a flush manner when the wear ring is circumferentially compressed.

The forming may comprise cutting by electronic discharge machining.

BRIEF DESCRIPTION OF THE DRAWING

Embodiments will now be described more fully with reference to the accompanying drawings in which.

DETAILED DESCRIPTION

Figure 1:
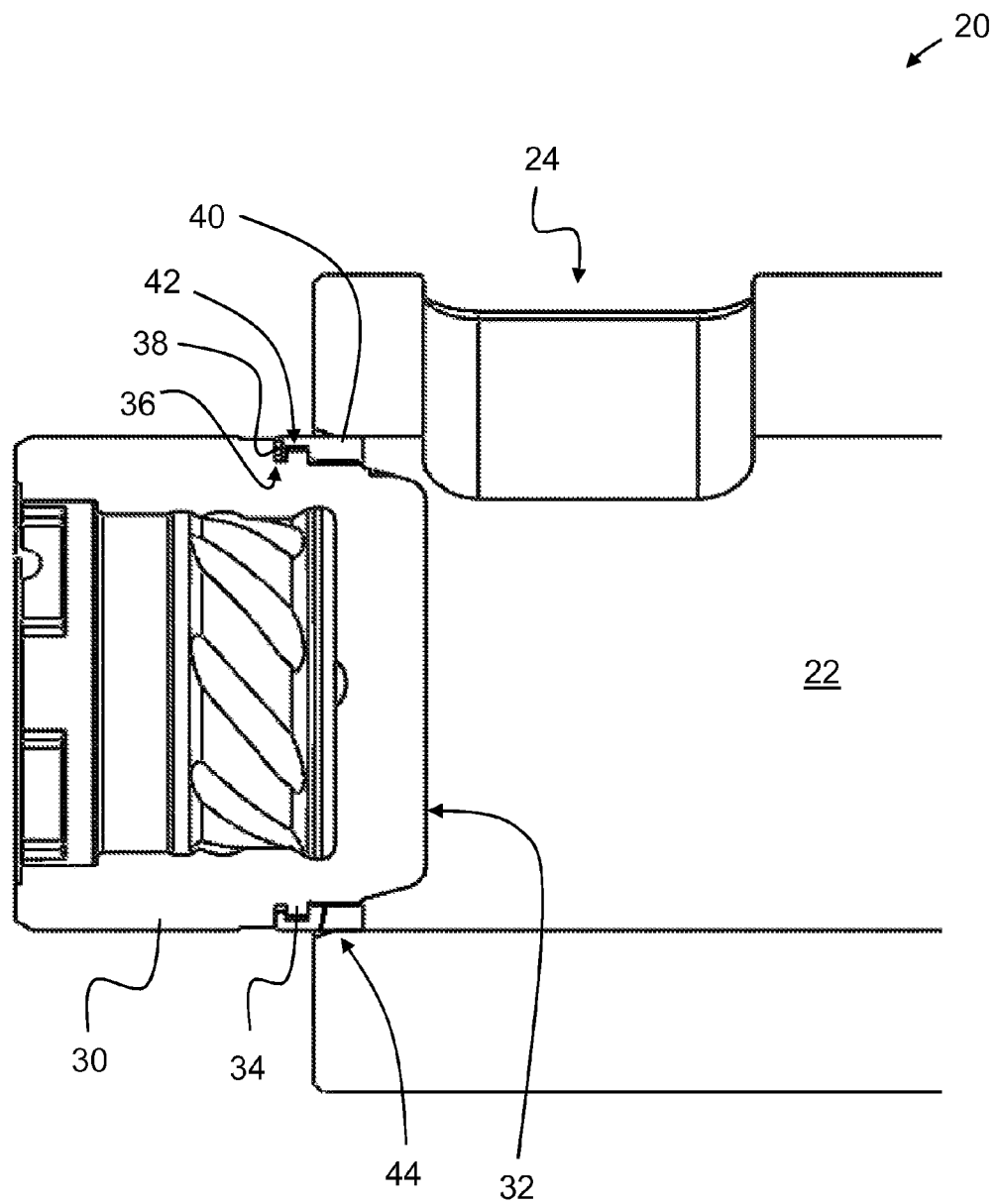
FIG. 1 is a side sectional view of a portion of a prior art die-casting apparatus, comprising a piston having a piston tip.
Figure 2:
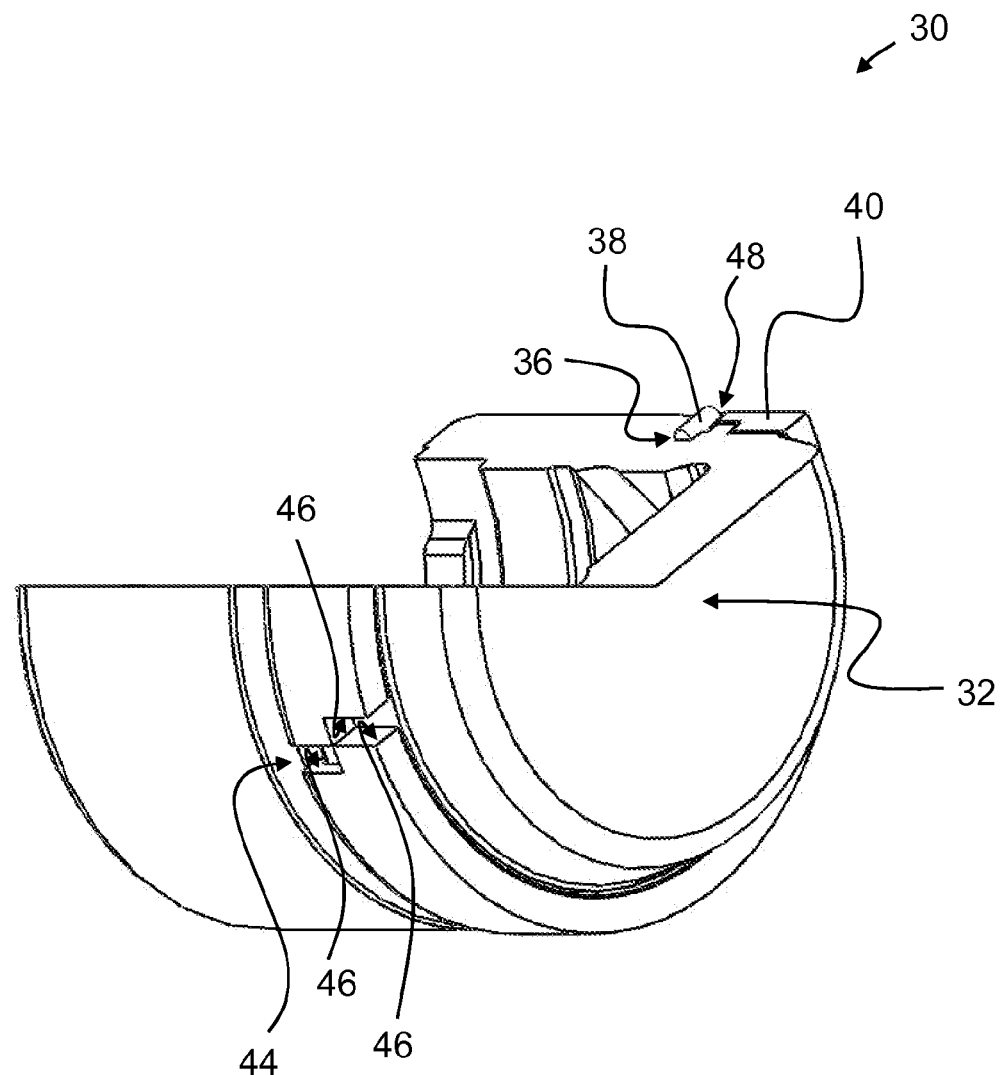
FIG. 2 is a sectional view of the piston tip of FIG. 1, showing a wear ring mounted thereon.
Figure 3:
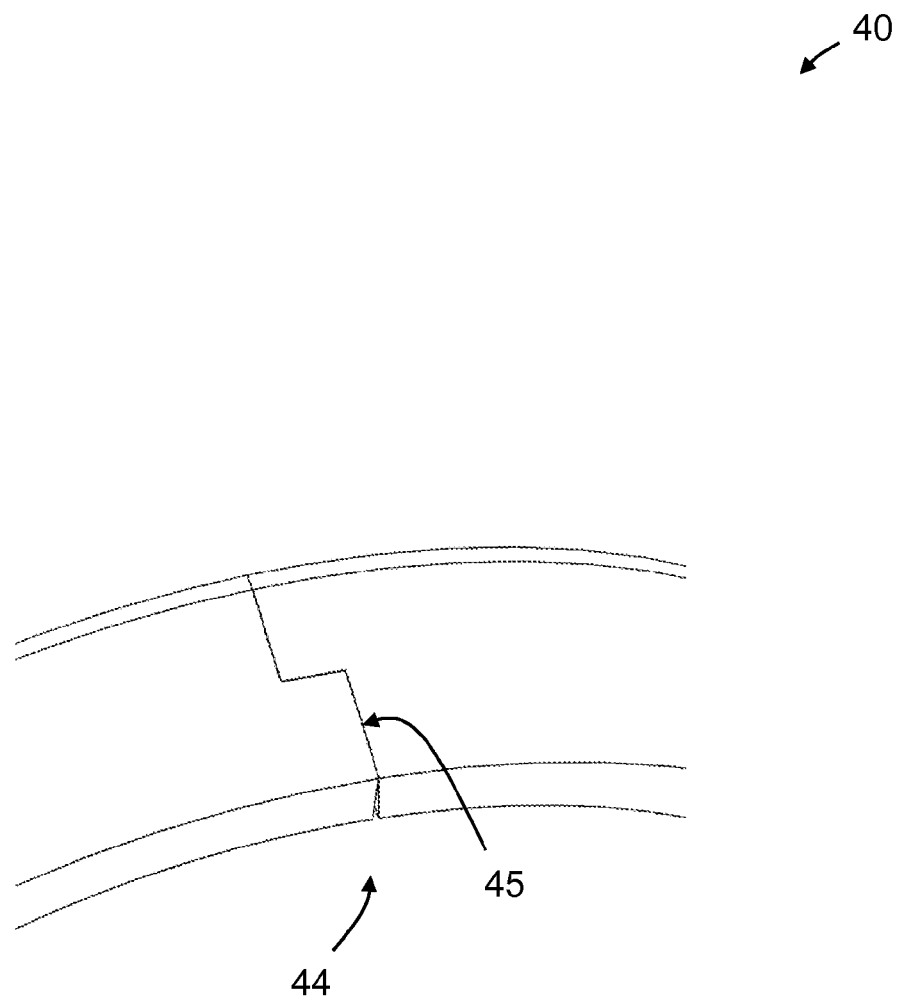
FIG. 3 is a perspective view of a portion of the wear ring of FIG. 2, the wear ring being under circumferential compression.
Figure 4:
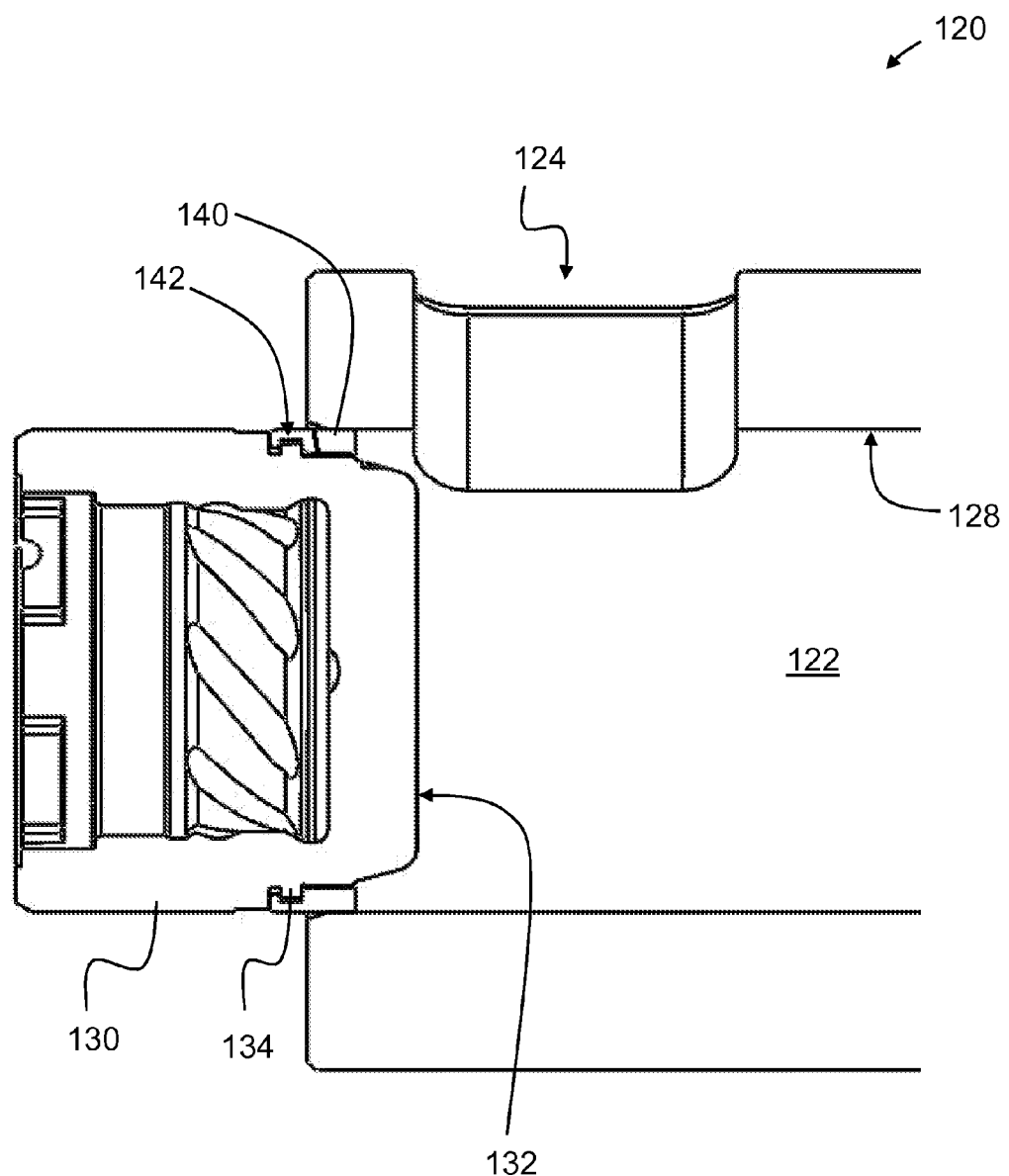
FIG. 4 is a side sectional view of a portion of a die-casting apparatus, comprising a piston having a piston tip.
Figure 5:
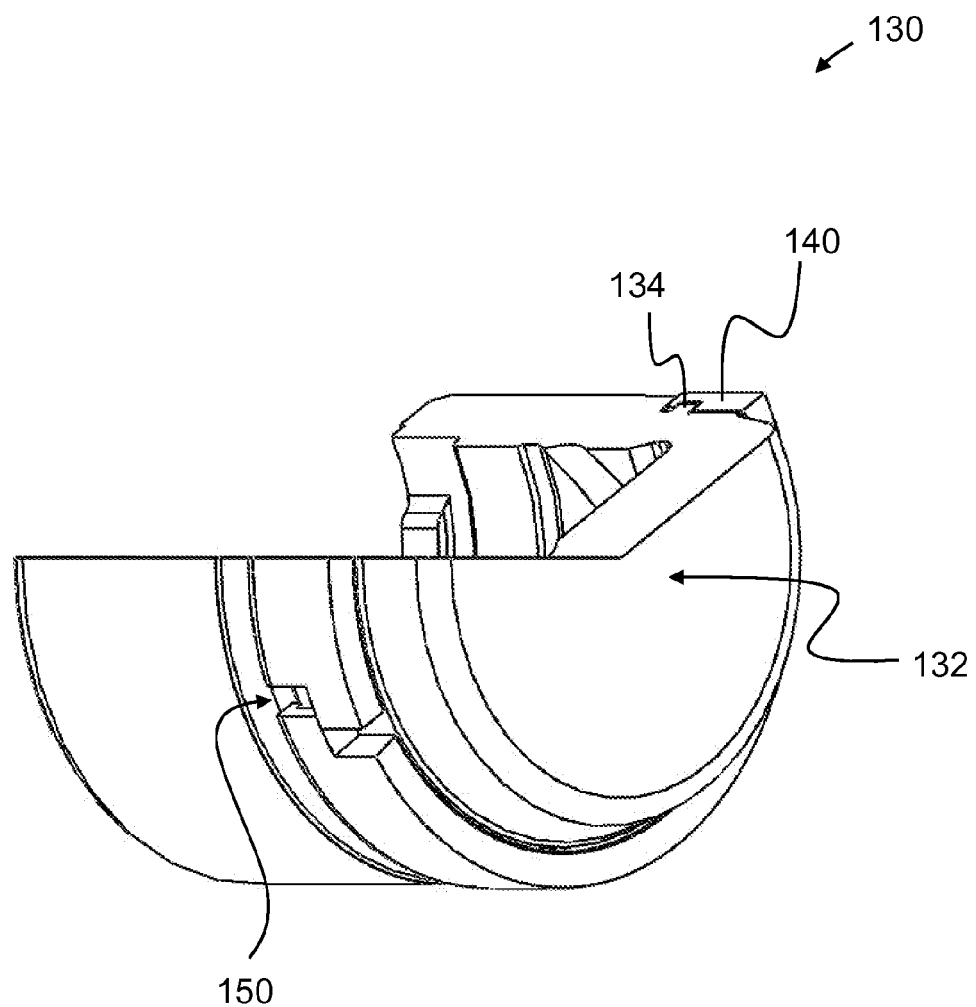
FIG. 5 is a sectional view of the piston tip of FIG. 4, showing a wear ring mounted thereon.
Figure 6:
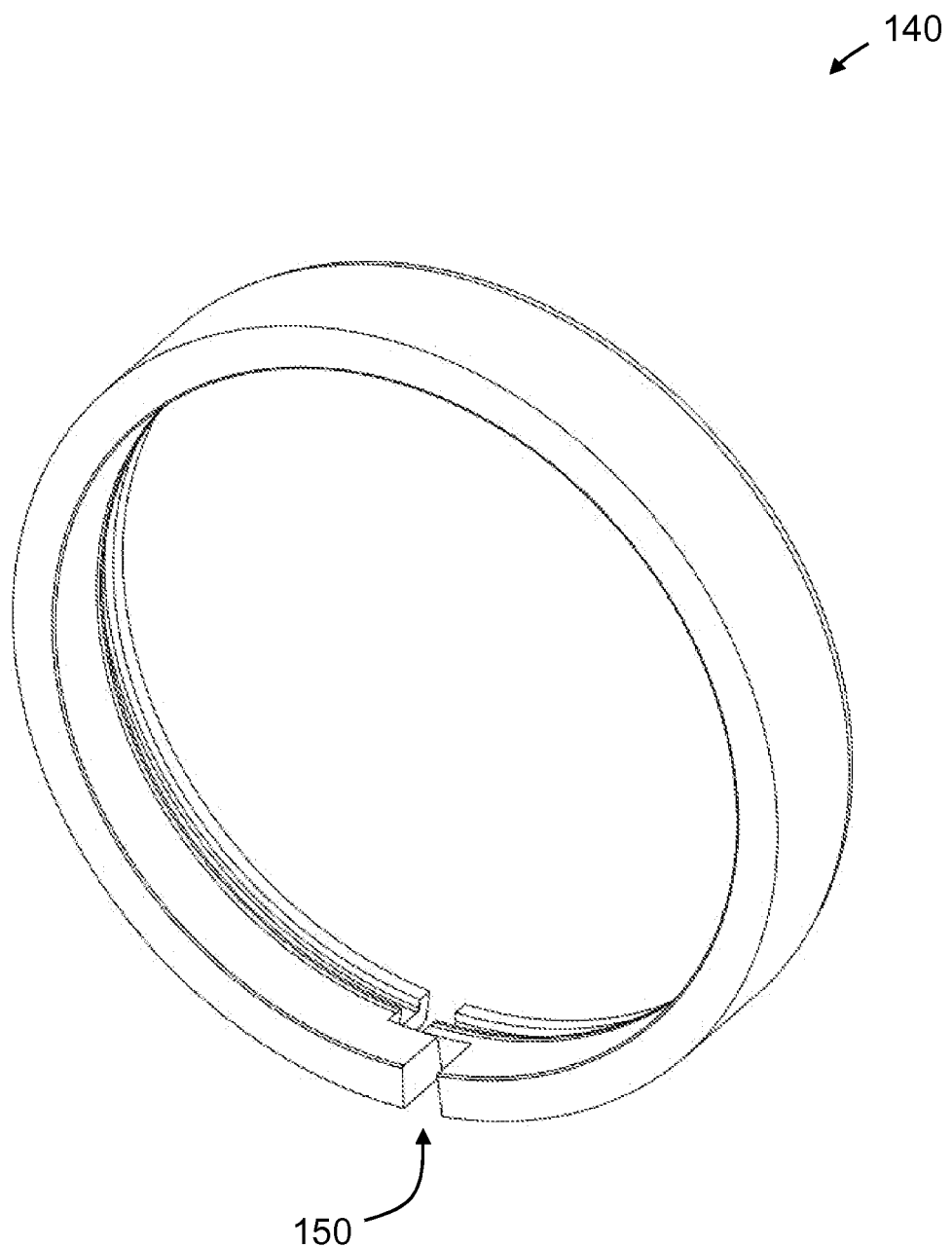
FIG. 6 is a perspective view of the wear ring of FIG. 5.
Figure 7:
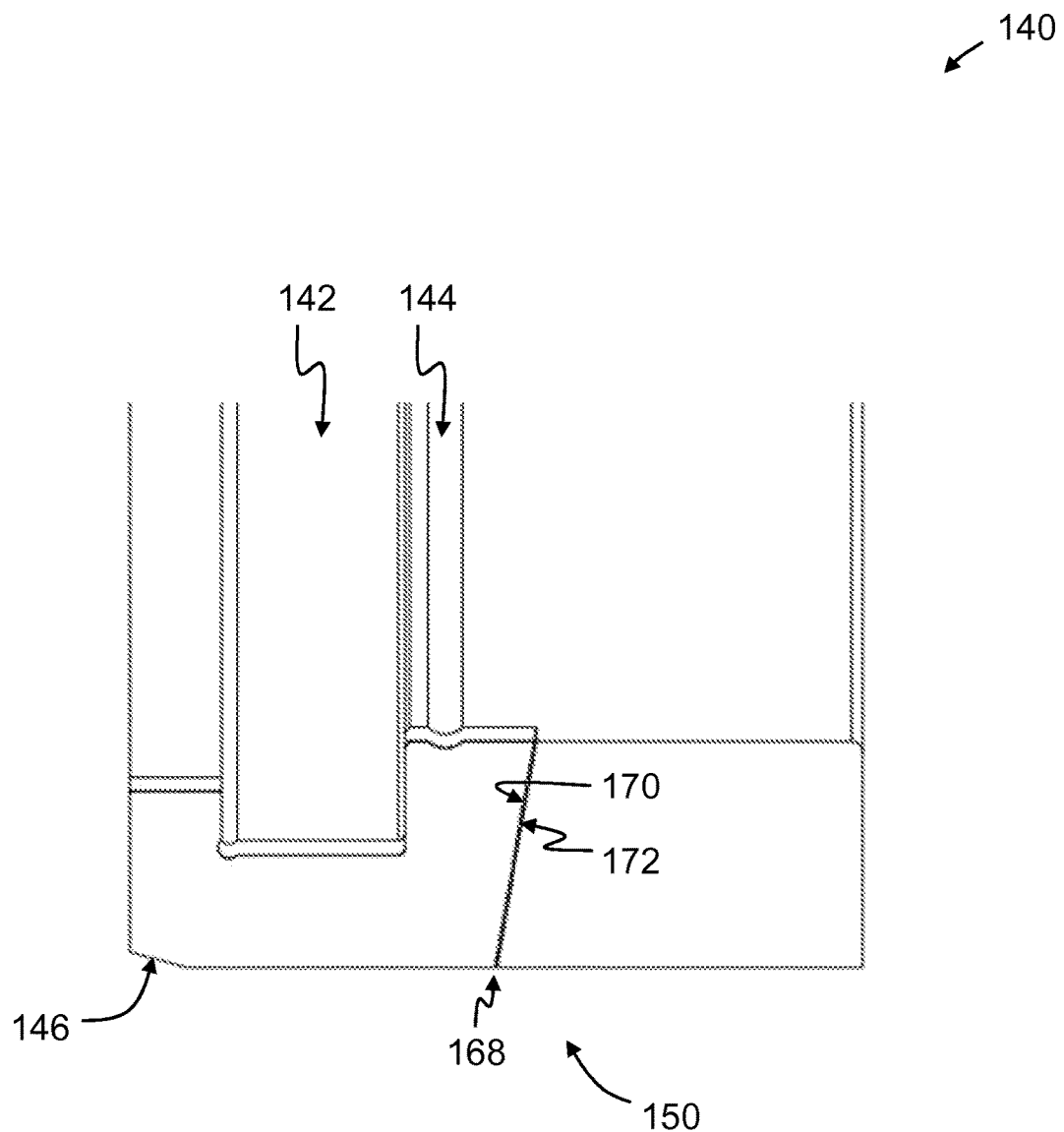
FIG. 7 is a side sectional view of a portion of the wear ring of FIG. 5.
Figure 8:
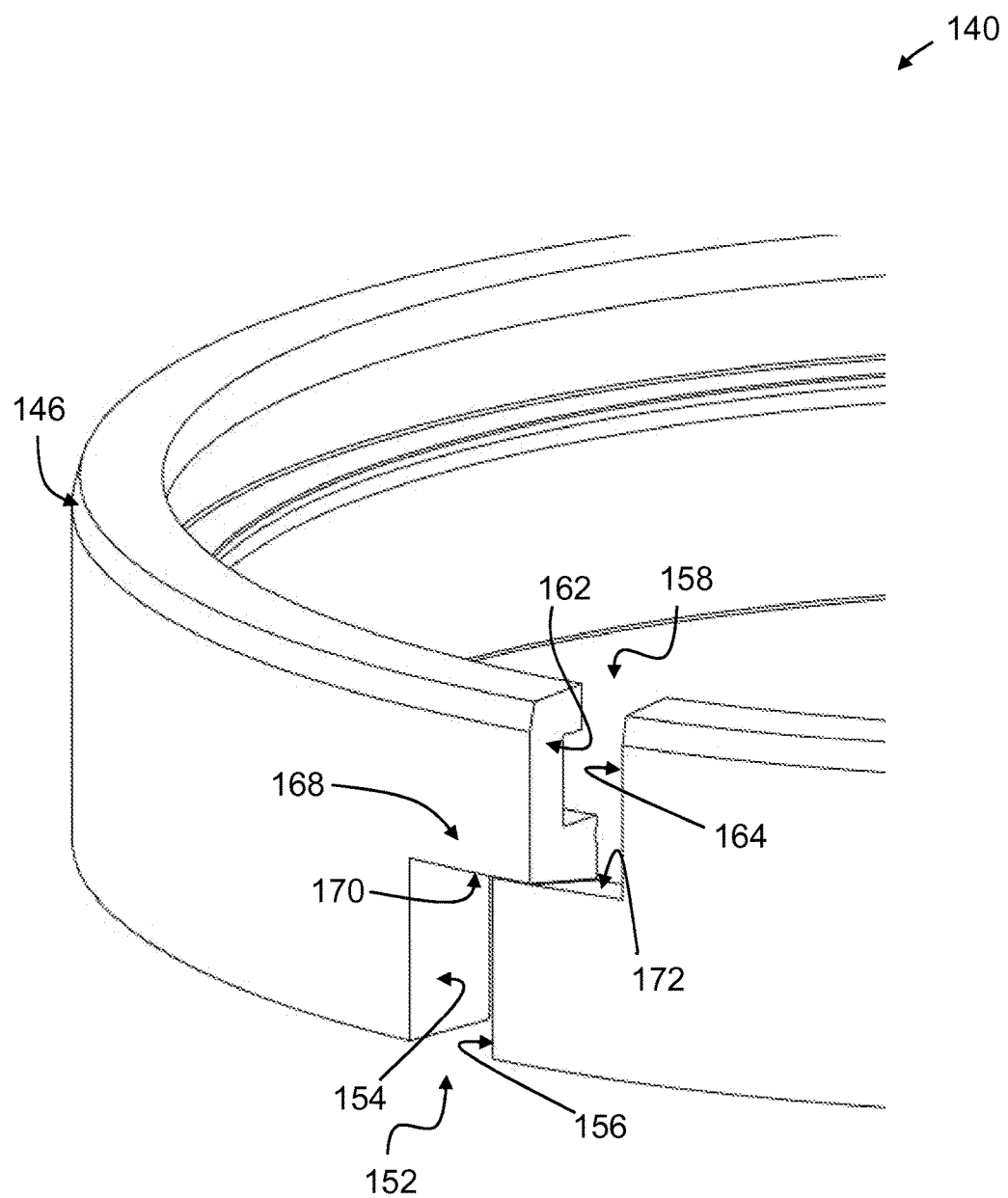
FIG. 8 is a perspective view of a portion of the wear ring of FIG. 5.
Figure 9:
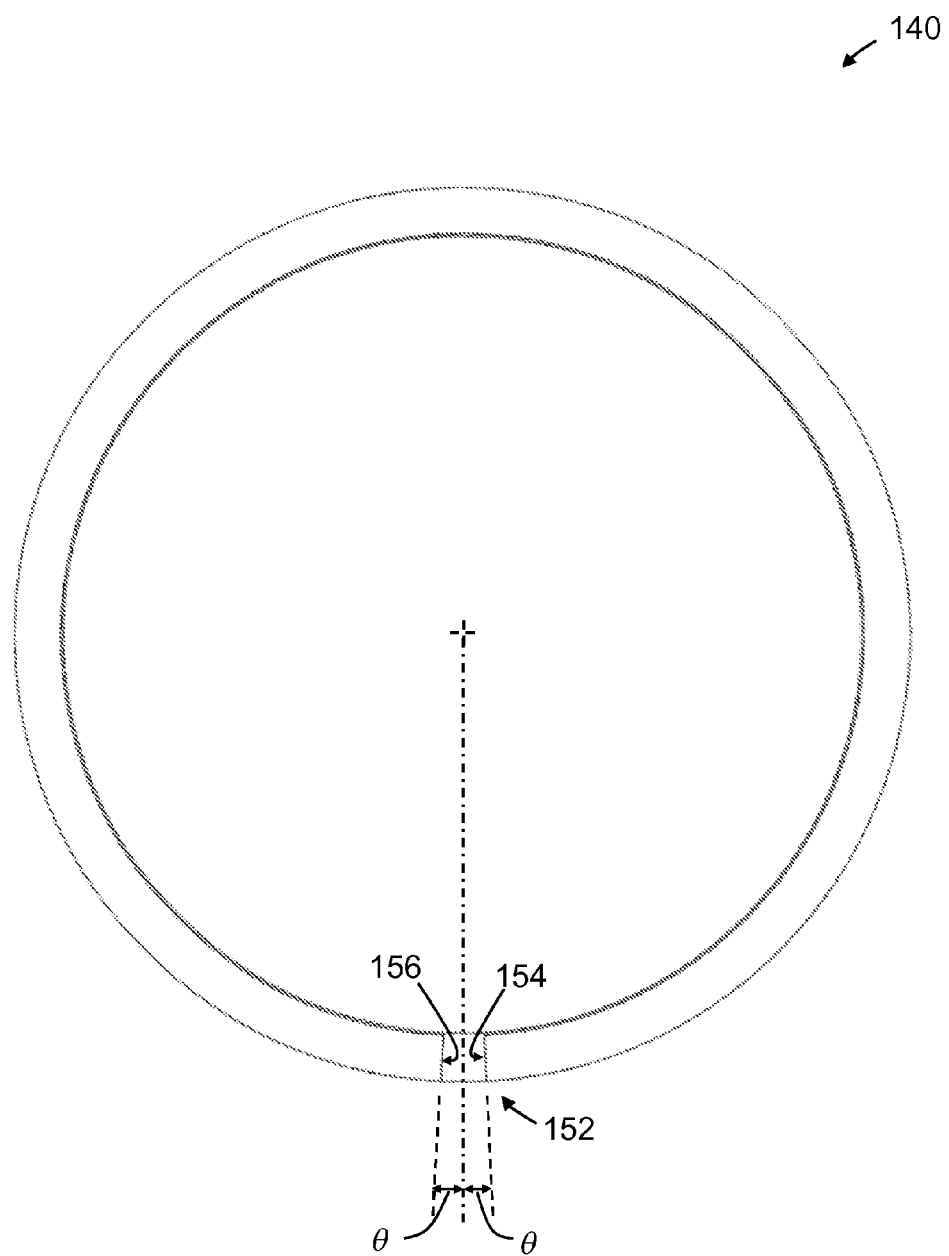
FIG. 9 is a front view of the wear ring of FIG. 5.
Figure 10:
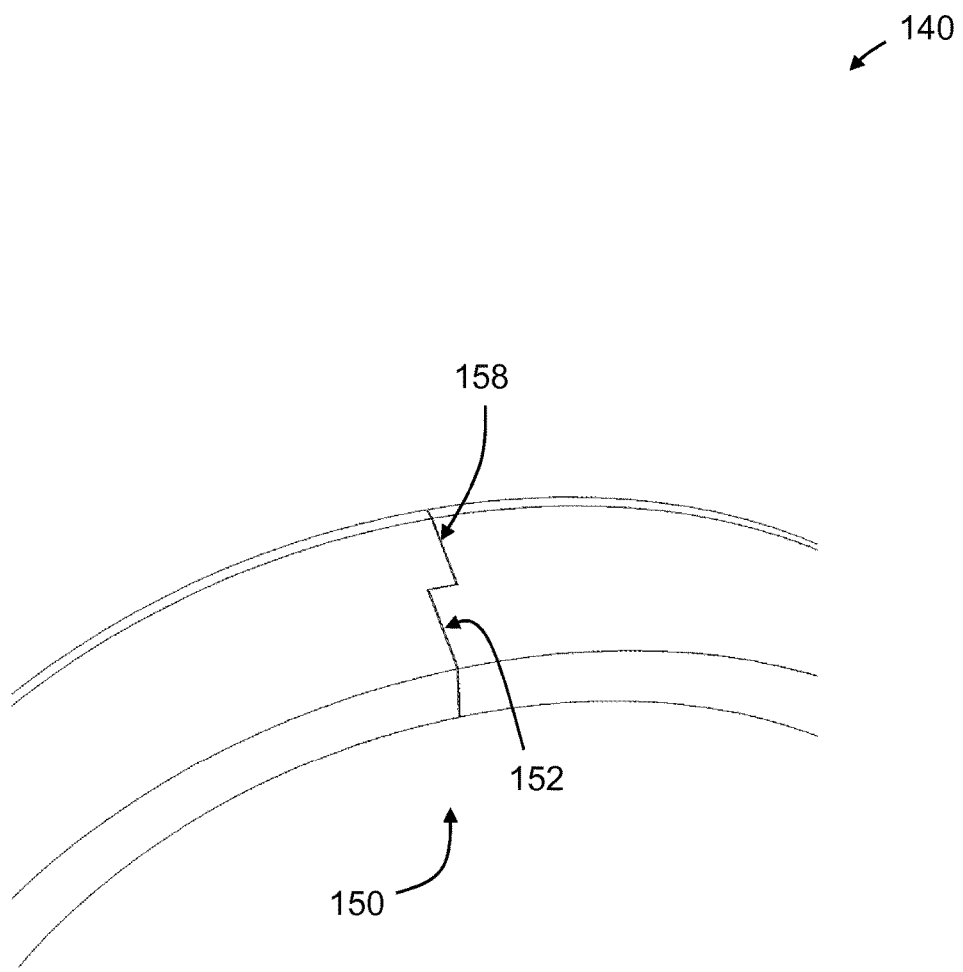
FIG. 10 is a perspective view of a portion of the wear ring of FIG. 5, the wear ring being under circumferential compression.

Turning now to FIGS. 4 and 5, a portion of a vacuum-assisted die-casting apparatus is shown, and is generally indicated by reference numeral 120. Vacuum-assisted die-casting apparatus 120 comprises a piston that is moveable within a piston bore 122 for pushing a volume of liquid metal (not shown) into a die-casting mold cavity (not shown) to form a casting. In the example shown, the piston is positioned at its starting position of the stroke, which is rearward of a port 124 through which the volume of liquid metal is introduced into the piston bore 122.

The piston comprises a piston tip 130 mounted on a forward end of a piston stem (not shown). The piston tip 130 has a front face 132 that is configured to contact the volume of liquid metal introduced into the piston bore 122 via port 124. The piston tip 130 has a circumferential rib 134 formed on an outer surface thereof rearward of the front face 132. The piston tip 130 comprises a replaceable wear ring 140 disposed on the circumferential rib 134.

The wear ring 140 may be better seen in FIGS. 6 to 10. Wear ring 140 comprises a body having a generally annular shape and is fabricated of a resilient material. In this embodiment, the wear ring 140 is fabricated of DIN 1.2344 grade steel. The wear ring 140 comprises an inner circumferential groove 142 that is shaped to receive the circumferential rib 134 of the piston tip 130. The wear ring 140 also comprises a circumferential groove 144 that is configured to trap liquid metal passing between the wear ring 140 and the piston tip 130 during operation. The wear ring 140 also comprises a rear beveled surface 146 for facilitating rearward movement of the piston through the piston bore during operation.

The wear ring 140 further comprises a gap 150 for facilitating installation and removal of the wear ring 140 onto and from the piston tip 130. The gap 150 does not extend straight through the wear ring, but rather comprises two or more circumferentially offset pairs of circumferentially spaced apart facing surfaces that are joined together by at least one step or jog. As will be understood, the gap 150 enables the wear ring 140 to expand and contract as needed during operation of the piston.

The gap 150 is formed by cutting an otherwise continuous ring. In this embodiment, the gap 150 is formed by electronic discharge machining (EDM). The gap 150 comprises a first portion 152 extending in the axial direction and defining circumferentially spaced apart facing surfaces 154 and 156, a second portion 158 extending in the axial direction and defining circumferentially spaced apart facing surfaces 162 and 164, and an intermediate portion 168 extending in the circumferential direction and joining the first portion 152 and the second portion 158, and defining facing surfaces 170 and 172. As may be seen in FIG. 8, the first and second portions 152 and 158 are circumferentially offset.

In this embodiment, the first portion 152 of the gap 150 is machined using angled cutting. As a result, each of the facing surfaces 154 and 156 is inwardly angled, such that each of the facing surfaces 154 and 156 defines an angle θ with a radial line extending through the center of the first portion 152, as may be seen in FIG. 9. The radial line bisects the gap between the facing surfaces 154 and 156, and the facing surfaces 154 and 156 are angled in a direction towards the inner diameter of the body. In this embodiment, the second portion 158 of the gap 150 is also machined using angled cutting and, as a result, each of the facing surfaces 162 and 164 is inwardly angled such that each defines an angle θ with a radial line extending through the center of the second portion 158. The radial line bisects the gap between the facing surfaces 162 and 164, and the facing surfaces 162 and 164 are angled in a direction towards the inner diameter of the body In use, the wear ring 140 is installed onto the piston tip 130 by fitting the inner circumferential groove 142 onto the circumferential rib 134 of the piston tip 130. The piston having the piston tip 130 installed thereon is then inserted into the piston bore of the die-casting apparatus. As the wear ring 140 is sized such that its outer diameter is slightly greater than the inner diameter of the piston bore 122, insertion of the piston tip into the piston bore 122 causes the wear ring 140 to compress circumferentially. In response to the compression, the facing surfaces 154 and 156 and the facing surfaces 162 and 164 are brought into respective contact with each other. As a result of the angled cutting, the facing surfaces 154 and 156 contact each other in a flush manner, such that generally the entirety of the surface 154 contacts generally the entirety of the surface 156. Similarly, as a result of the angled cutting, the facing surfaces 162 and 164 contact each other in a flush manner, such that generally the entirety of the surface 162 contacts generally the entirety of the surface 164.

At the beginning of a stroke cycle, the piston is positioned at its starting position in the piston bore 122, and a volume of liquid metal is introduced into the piston bore 122 forward of the piston tip 130 via port 124. The piston is then moved forward through the piston bore 122 to push the volume of liquid metal into the mold cavity for forming a metal casting, and is then moved rearward to its starting position to complete the stroke cycle. During this movement, the wear ring 140 disposed on the piston tip 130 continuously contacts the inner surface 128 of the piston bore 122, and provides a liquid metal seal for preventing liquid metal from passing between the piston tip 130 and the inner surface 128 of the piston bore 122. The wear ring 140 also provides a vacuum seal for maintaining vacuum (that is, a low pressure) within the forward volume of the piston bore 122. The cycle is repeated, as desired, to produce multiple metal castings.

As will be appreciated, the angled cutting of the wear ring 140 allows generally the entireties of the facing surfaces 154 and 156 and generally the entireties of the facing surfaces 162 and 164 to respectively contact each other in a flush manner, which advantageously enables the wear ring 140 to provide a better liquid metal seal as compared to conventional wear rings. As a result, the piston tip 130 may advantageously be operated with the wear ring 140 disposed thereon in any rotational position. Unlike conventional wear rings, the gap 150 is not required to be positioned on an underside of the piston tip 130 in order to reduce its exposure to liquid metal during operation. The wear ring 140 can thus be advantageously installed onto, and removed from, the piston tip 130 in a more facile manner as compared to conventional wear rings.

Further, and as will be appreciated, the wear ring 140 is configured to be installed onto the piston tip 130 without a retaining pin. As a result, the wear ring 140 does not require a notch to be machined therein for accommodating a retaining pin, which could otherwise provide a stress concentration point within the wear ring and cause mechanical failure. The wear ring 140 thus advantageously has better structural integrity and greater strength as compared to conventional wear rings that are intended for use with retaining pins.

Although in the embodiment described above, the piston tip has a circumferential rib formed on an outer surface thereof, and the wear ring comprises an inner circumferential groove that is shaped to accommodate the circumferential rib, in other embodiments, other configurations may be alternatively used. For example, in one embodiment, the piston tip may alternatively comprise one or more recesses, with each recess being configured to receive a tab protruding inwardly from an inner surface of the wear ring. As another example, in another embodiment the piston tip may alternatively have a plurality of projections formed on the outer surface thereof, and the wear ring may comprise a plurality of grooves or recesses, with each groove or recess being configured to receive a projection.

Although in the embodiment described above, the gap comprises a first portion and a second portion, with each of the first and second portions extending in the axial direction and defining circumferentially spaced apart facing surfaces, in other embodiments, one or both of the first portion and the second portion may alternatively extend in a non-axial direction. For example, in one embodiment, one or both of the first portion and the second portion may alternatively define circumferentially spaced apart facing surfaces that define an angle with the axial direction.

Although in the embodiment described above, each of the circumferentially spaced apart facing surfaces of each of the first and second portions is inwardly angled such that each surface defines an angle θ with a radial line extending through the center of the portion, in other embodiments, only one (1) of the circumferentially spaced apart facing surfaces of one or both of the first and second portions may alternatively be inwardly angled such that the angled surface(s) define(s) an angle θ with a radial line extending through the center of the portion.

Although in the embodiment described above, the gap comprises three (3) portions, namely a first portion and a second portion that are joined by an intermediate portion, in other embodiments, the gap may alternatively comprise a different number of portions. For example, although in the embodiment described above, the gap comprises a first portion and a second portion each extending in the axial direction and each defining circumferentially spaced apart facing surfaces that are inwardly angled, in other embodiments, the gap may alternatively comprise more than two portions each extending in the axial direction and each defining circumferentially spaced apart facing surfaces that are inwardly angled. In a related embodiment, the gap may further comprise more than one intermediate portion extending in the circumferential direction and defining facing surfaces, wherein adjacent portions that define circumferentially spaced, angled facing surfaces are joined by a respective intermediate portion.

Although in the embodiment described above, the gap is formed by electronic discharge machining (EDM) of an otherwise continuous ring, in other embodiments, the gap may alternatively be formed by another suitable method. In still other embodiments, the wear ring comprising the gap may alternatively be formed by casting.

Although in the embodiment described above, the wear ring is fabricated of DIN 1.2344 grade steel, in other embodiments, the wear ring may alternatively be fabricated of another grade of steel, such as for example DIN 1.2367 grade steel. In still other embodiments, the wear ring may alternatively be fabricated of any suitable tool steel, or of any other suitable material, such as for example a copper beryllium alloy.

The wear ring may be suitably sized so as to be mountable on a piston tip for use in piston bores having inner diameters in a range of from about 1 inch to about 10 inches. The value of the angle θ may range from about 1 degree to about 4 degrees.

Although in the embodiment described above, the piston tip and the wear ring are for use in a vacuum-assisted die casting apparatus, it will be understood that the piston tip and the wear ring may alternatively be used in a non-vacuum assisted die casting apparatus.

The following example illustrates an application of the above-described embodiment.

EXAMPLE

In this example, a wear ring is configured to be mounted on a piston tip for use in a vacuum-assisted die casting apparatus having a piston bore that has an inner diameter of about 4.00 inches. The wear ring is fabricated of DIN 1.2344 grade steel, and the gap in the wear ring is formed by electronic discharge machining. As machined, the wear ring has an outer diameter of about 4.06 inches, a smallest inside diameter of about 3.60 inches, an axial length of about 0.79 inches, and an angle θ of about 2.92 degrees.

When mounted on the piston tip and inserted into the piston bore, the wear ring is compressed circumferentially, whereby the outer diameter is reduced to about 4.00 inches and the smallest inside diameter is reduced to about 3.54 inches.

Although embodiments have been described above with reference to the accompanying drawings, those of skill in the art will appreciate that variations and modifications may be made without departing from the scope thereof as defined by the appended claims.

What is claimed is:

1. A wear ring for a piston of a die-casting apparatus, the wear ring comprising:
an annular body having a gap extending therethrough, the gap being configured to define at least two circumferentially offset pairs of circumferentially spaced apart facing surfaces, the facing surfaces of each pair being angled and configured to contact each other in a flush manner when the wear ring is circumferentially compressed,
wherein both of the facing surfaces of each pair define an angle with a radial line that bisects the gap between the facing surfaces, the angle defined by each surface being the same, and the angle is from about 1 degree to about 4 degrees, or
wherein one of the facing surfaces of each pair defines an angle with a radial line that bisects the gap between the facing surfaces, and the angle is from about 1 degree to about 4 degrees.

2. The wear ring of claim 1, wherein both of the facing surfaces of each pair extend in an axial direction of the wear ring.

3. The wear ring of claim 1, further comprising at least one feature on the annular body configured to engage the piston.

4. The wear ring of claim 3, wherein the at least one feature is one of at least one projection and at least one inner circumferential groove.

5. The wear ring of claim 1, wherein both of the facing surfaces of each pair extend in an axial direction of the wear ring.

6. The wear ring of claim 1, further comprising at least one feature on the annular body configured to engage the piston.

7. The wear ring of claim 6, wherein the at least one feature is one of at least one projection and at least one inner circumferential groove.

8. A piston of a die-casting apparatus, the piston comprising:
a piston tip configured to push liquid metal through a piston bore; and
a wear ring disposed on an outer surface of the piston tip, the wear ring comprising an annular body having a gap extending therethrough, the gap being configured to define at least two circumferentially offset pairs of circumferentially spaced apart facing surfaces, the facing surfaces of each pair being angled and configured to contact each other in a flush manner when the wear ring is circumferentially compressed,
wherein both of the facing surfaces of each pair define an angle with a radial line that bisects the gap between the facing surfaces, the angle defined by each surface being the same, and the angle is from about 1 degree to about 4 degrees, or
wherein one of the facing surfaces of each pair defines an angle with a radial line that bisects the gap between the facing surfaces, and the angle is from about 1 degree to about 4 degrees.

9. The piston of claim 8, wherein both of the facing surfaces of each pair extend in an axial direction of the wear ring.

10. The piston of claim 8, further comprising at least one feature on the annular body configured to engage the piston.

11. The piston of claim 10, wherein the at least one feature is one of at least one projection and at least one inner circumferential groove.

12. A die-casting apparatus comprising the piston of claim 8.

13. The die-casting apparatus of claim 12, wherein the die-casting apparatus is a vacuum-assisted die-casting apparatus.

14. A wear ring for a piston of a die-casting apparatus, the wear ring comprising:
an annular body having a gap extending therethrough, the gap being configured to define at least two circumferentially offset pairs of circumferentially spaced apart facing surfaces, the facing surfaces of each pair being angled and configured to contact each other in a flush manner when the wear ring is circumferentially compressed, two of the circumferentially offset pairs of facing surfaces being joined by a pair of additional facing surfaces, the additional facing surfaces being inclined relative to a radial line that bisects the gap between either pair of facing surfaces,
wherein both of the facing surfaces of each pair define an angle with a radial line that bisects the gap between the facing surfaces, the angle defined by each surface being the same, and the angle is from about 1 degree to about 4 degrees, or wherein one of the facing surfaces of each pair defines an angle with a radial line that bisects the gap between the facing surfaces, and the angle is from about 1 degree to about 4 degrees.

* * * * *